United States Patent [19]
Yandle, II

[11] Patent Number: 5,162,006
[45] Date of Patent: Nov. 10, 1992

[54] PORTABLE SAFETY APPARATUS

[76] Inventor: Sylvester E. Yandle, II, 5883 Rhodes Ave., New Orleans, La. 70131

[21] Appl. No.: 716,749

[22] Filed: Jun. 18, 1991

Related U.S. Application Data

[63] Continuation of Ser. No. 364,240, Jun. 7, 1991, abandoned.

[51] Int. Cl.$^5$ .............................................. A62B 7/00
[52] U.S. Cl. ........................................ 441/96; 280/733
[58] Field of Search ....................... 441/80, 90, 92-94, 441/96, 99, 106-117, 123; 244/121, 122 R, 122 AG; 280/728, 730, 733, 737, 740-743; 297/470, 471; 2/2, 2.1 R; 425/816; 128/205.13-205.15, 205.17, 205.22, 205.24, 205.25, 204.18, 204.27, 204.28, 206.12, 206.15, 206.21, 206.24, 206.28, 207.11-207.13

[56] References Cited

U.S. PATENT DOCUMENTS

| | | | |
|---|---|---|---|
| 1,600,263 | 9/1926 | Williams | 441/99 |
| 1,837,089 | 12/1931 | Wosk | 441/123 |
| 2,116,094 | 10/1972 | Schwartz | 280/733 |
| 2,210,809 | 8/1940 | Gray | 441/123 |
| 2,818,858 | 1/1958 | Holm | 441/123 |
| 2,823,396 | 2/1958 | Erickson | 441/94 |
| 3,146,460 | 9/1964 | Henderson | 280/733 X |
| 3,243,822 | 4/1986 | Lipkin | 280/733 |
| 3,430,979 | 3/1969 | Terry | 280/733 |
| 3,536,071 | 10/1970 | Ferrando | 441/96 |
| 3,682,498 | 8/1972 | Rutzki | 280/733 |
| 3,706,462 | 12/1972 | Lilly | 282/733 |
| 3,771,183 | 11/1973 | Moran | 441/123 |
| 3,801,156 | 4/1974 | Granig | 280/733 |
| 3,930,667 | 1/1976 | Osuchowski et al. | 280/150 AB |
| 4,059,852 | 11/1977 | Crane | 2/2 |
| 4,272,857 | 6/1981 | Oldham | 441/92 |
| 4,324,234 | 4/1982 | Maness | 441/123 |
| 4,348,037 | 9/1982 | Law | 280/733 |
| 4,685,890 | 8/1987 | Edwards | 441/94 |
| 4,779,554 | 10/1988 | Courtney | 441/96 |
| 4,971,354 | 11/1990 | Kim | 280/733 |

Primary Examiner—Joseph F. Peters, Jr.
Assistant Examiner—Clifford T. Bartz
Attorney, Agent, or Firm—Pravel, Gambrell, Hewitt, Kimball & Krieger

[57] ABSTRACT

A portable safety vest (20) includes an inflatable collar (22) which functions as a personal floatation device, a transparent, inflatable air bag (50), and an air mask (60). A cylinder of compressed air (40) has a seal (41) and, when the seal (41) is broken by a triggering mechanism (42, 43, 44), the compressed air expands and fills the air bag (50) and the collar (22). The air bag (50) is preferably large enough to hold at least a two-minute supply of air to allow one time to escape from an area filled with smoke or noxious or toxic gas.

15 Claims, 2 Drawing Sheets

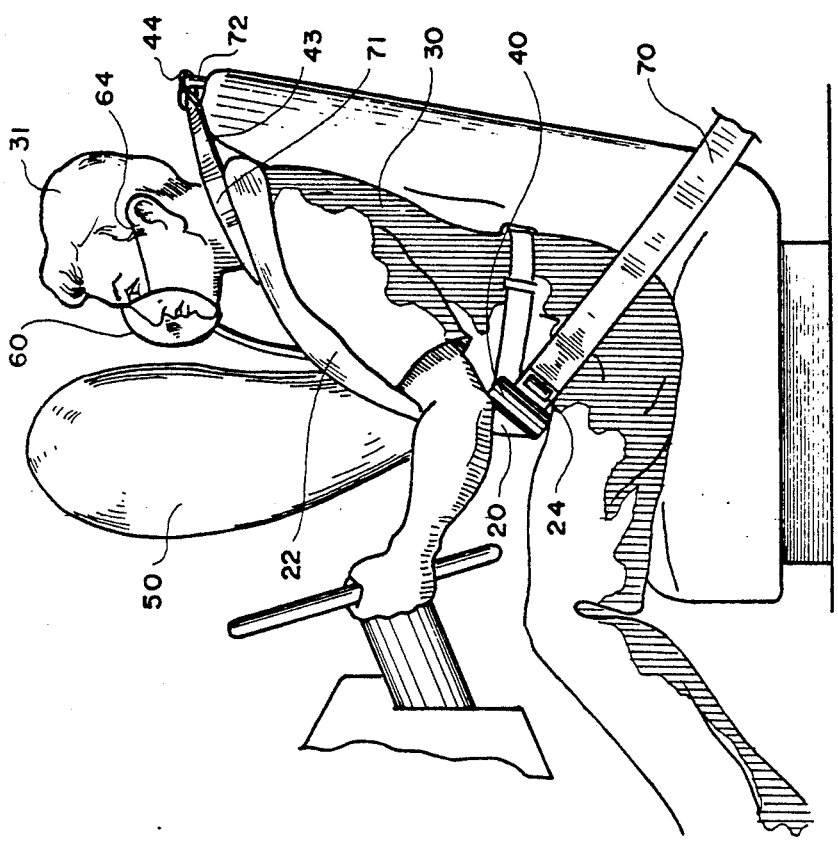
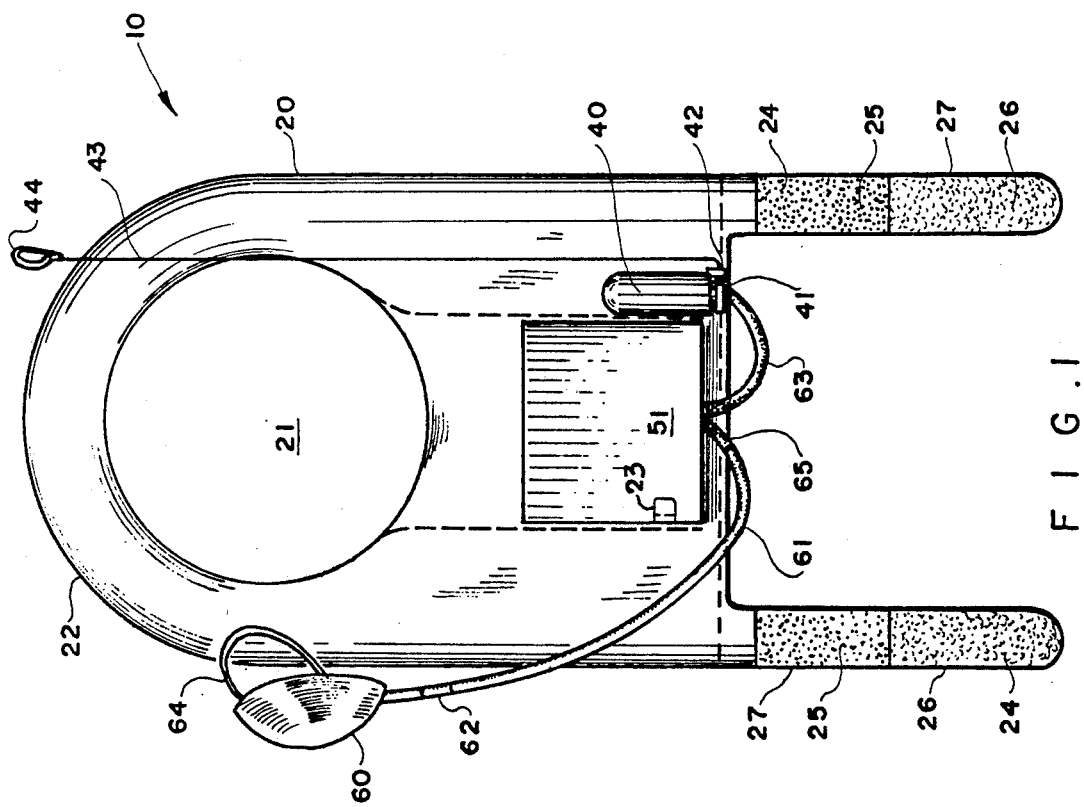

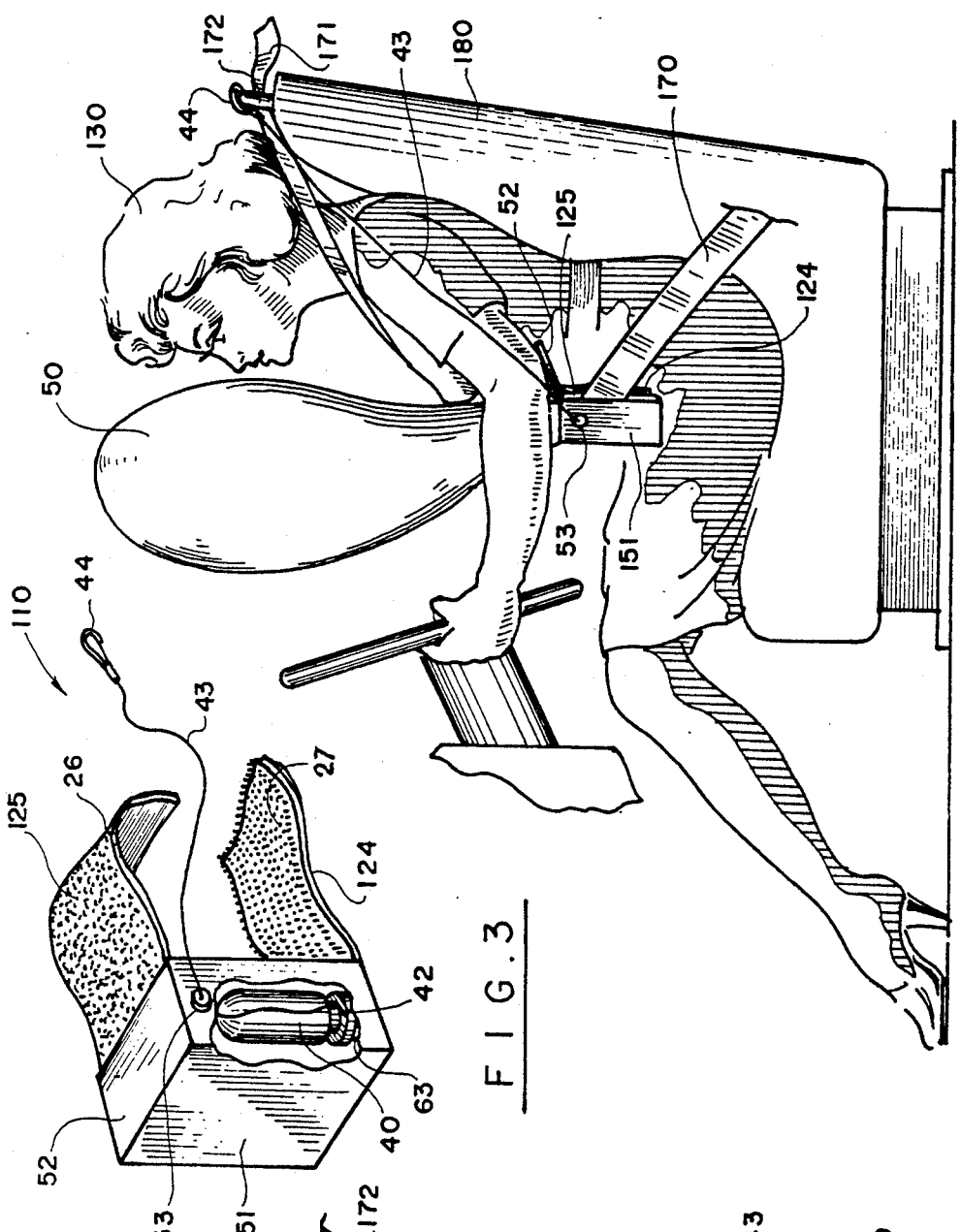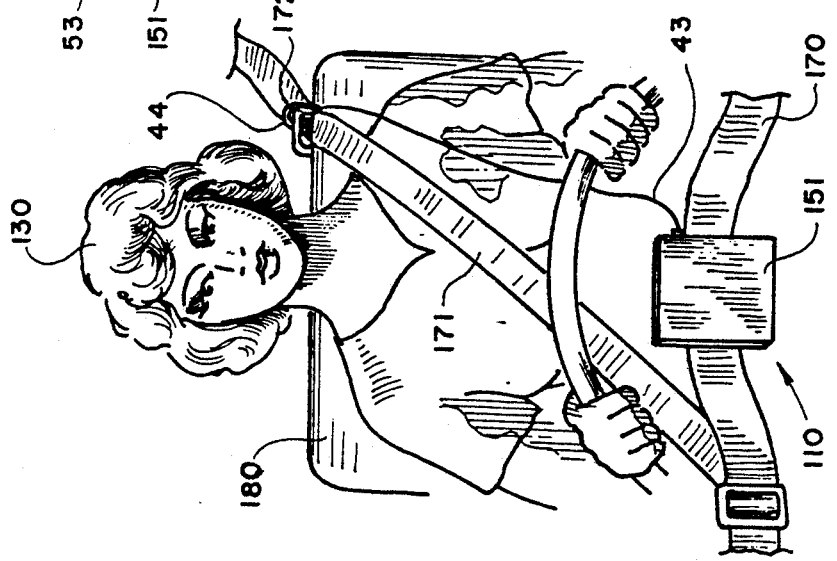

PORTABLE SAFETY APPARATUS

This is a continuation of co-pending U.S. patent application Ser. No. 07/364,240 filed on Jun. 7, 1991, now abandoned.

BACKGROUND OF THE INVENTION

1. Field of the Invention

The present invention relates generally to safety devices, and more particularly to portable safety devices.

2. General Background

Air bags can help prevent serious injury to one's head in the event of a collision in a vehicle; however, not all vehicles are equipped with air bags. When travelling on or over water, it is advantageous to have a personal floatation device handy in the event of an accident. When one is in a location where smoke or noxious or toxic gas may be present, it is useful to have an emergency supply of fresh air.

Henderson, U.S. Pat. No. 3,146,460, discloses a portable, normally deflated personal safety device (see FIG. 2 thereof) including a supply of compressed air. The compressed air is used to inflate the device. The inflation may be automatic in response to certain predetermined conditions, or may be manually initiated.

Rutzki, U.S. Pat. No. 3,682,498, discloses safety belts which are preferably over 12 centimeters wide and which inflate automatically in response to tension applied to the belts. Compressed air is disclosed as a means for inflating the belts.

Osuchowski et al. and Crane (U.S. Pat. Nos. 3,930,667 and 4,059,852) disclose inflatable suits for motorcycle riders. The means for inflating the suit can be activated either automatically in response to a collision or manually.

Williams, Erickson, Oldham, and Edwards (U.S. Pat. Nos. 1,600,263; 2,823,396; 4,272,857; and 4,685,890, respectively) disclose inflatable life jackets.

None of these patents discloses portable safety apparatus including an air bag having an air mask connected thereto, or safety apparatus comprising an air bag and a personal floatation device.

SUMMARY OF THE PRESENT INVENTION

The present invention comprises a safety device, which is preferably worn by a person, and which, in a first embodiment, includes a portable air bag and an air mask which is operably connected to the air bag. In response to a collision, or in response to a manual initiation, the air bag inflates with breathable air. There is preferably also included an inflatable vest which can serve as a personal floatation device. Alternatively, the device may comprise a portable air bag and an inflatable vest which can serve as a personal floatation device, without an air mask.

The air bag is useful when the person wearing the safety device is in a vehicle or aircraft involved in a collision. The air mask is useful when the person wearing the safety device is in an area filled with smoke or noxious or toxic gases. The inflatable vest is useful when the person wearing the safety device is involved in an accident on a body of water. Thus, whether there is a collision, a fire, a toxic gas leak, or an accident involving a body of water, the present invention can increase one's chances of survival.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a front view of the apparatus of the preferred embodiment of the present invention; and FIG. 2 shows the apparatus of FIG. 1 in use in an aircraft.

FIG. 3 is a perspective, partially cut-away view of an alternative embodiment of the present invention.

FIG. 4 shows the apparatus of FIG. 3 releasably attached to a safety belt.

FIG. 5 shows the apparatus of FIG. 3 attached to a safety belt and shows the air bag inflated.

DETAILED DESCRIPTION OF THE PREFERRED EMBODIMENT

The preferred embodiment of the present invention, safety device 10, is shown in FIGS. 1 and 2. Safety device 10 comprises a vest 20 having an opening 21 therein to allow a person 30 (see FIG. 2) to put on vest 20 by slipping vest 20 over his head. Vest 20 includes a normally deflated collar 22 which serves as a personal floatation device when inflated. Collar 22 is preferably made of a lightweight plastic which is strong enough that collar 22 will not burst when inflated and used to support the wearer in a body of water. Collar 22 can, for example, be made of a polyester film, such as that sold by DuPont under the trademark Mylar. Alternatively, collar 22 could be made of the same plastic used to make inflatable life preservers stocked in commercial jet liners.

Vest 20 includes an air bag storage pouch 51 which contains an air bag 50 (see FIG. 2). Air bag 50 is normally deflated and, when deflated, is folded or rolled up in pouch 51. Air bag 50 is preferably made of a lightweight, fire-resistant transparent material, such as polyester film. An air mask 60 can also be stored in air bag storage pouch 51. Air mask 60 is connected to air bag 50 by flexible air tube 61, which also provides fluid communication between air bag 50 and air mask 60. A valve 65, which is preferably a reed valve, is located in tube 61 adjacent air bag 50. Valve 65 automatically responds to high pressure differential by closing; valve 65 acts as a means for preventing air from escaping from air bag 50 while air bag 50 is being inflated, as will be described below.

A valve 62, located in tube 61, allows fluid communication between air bag 50 and air mask 60 to be regulated. Opening valve 62 allows fluid communication between air mask 60 and air bag 50 so that one wearing air mask 60 can breathe the air in air bag 50.

A one-way flap valve 23, such as those used on inflatable air rafts, interconnects air bag 50 and inflatable collar 22. Valve 23 is positioned such that air may freely flow from air bag 50 to collar 22 but, for air to flow out of collar 22 into air bag 50, valve 23 must be squeezed.

A high pressure air cylinder 40 is securely attached to vest 20. Air cylinder 40 contains compressed, breathable gas, such as air, in a quantity sufficient to inflate air bag 50 and collar 22. Air cylinder 40 is connected to air bag 50 with flexible air tube 63. Air cylinder 40 is normally sealed with a seal 41 so that the compressed air therein remains therein. When the seal 41 closing air cylinder 40 is broken, fluid communication is established between air cylinder 40 and air bag 50 via flexible air tube 63, and the compressed air in air cylinder 40 expands and fills air bag 50 and, via valve 23, collar 22.

A trigger 42, with a suitable mechanism for piercing seal 41, is connected to air cylinder 40 and is connected, via a string 43, to a clip 44. Pulling string 43 upward causes trigger 42 to pierce seal 41, which allows air to flow out of air cylinder 40 and inflate air bag 50 and collar 22. String 43 may be manually pulled when it is desired to inflate air bag 50 and collar 22, or clip 44 may be clipped onto part of a vehicle in which the wearer of vest 20 is travelling so that a predetermined amount of forward motion of the wearer (as when the user is involved in a head-on crash) automatically causes string 43 to be pulled, causing trigger 42 to pierce seal 41.

Seat belt attachment straps 24 are integrally connected to collar 22, and have resilient hook-and-loop fastening material 25 thereon. Resilient hook-and-loop fastening material 25 comprises resilient hook material 27 and loop material 26. Material 25 may comprise the resilient hook-and-loop fasteners sold under the trademark "Velcro". Straps 24 can be used to fasten vest 20 to a seat belt 70 of a vehicle or aircraft, as shown in FIG. 2.

Air bag 50 preferably has a volume of at least 10 liters when inflated to allow it to provide some cushioning when one is in an accident. More preferably, air bag 50 has a volume of at least 20 liters to provide both cushioning when one is in an accident and also to provide enough air to allow one to breathe for approximately one minute. Air bag 50 most preferably holds enough air, when inflated, to allow one to breathe for at least two minutes. For an average person weighing 75 kilograms (165 pounds), this would be approximately 37 liters (1.3 cubic feet). In operation in a vehicle, such as an airplane (see FIG. 2), vest 20 is worn by a user 30 by slipping the user's head 31 through hole 21 in vest 20. Vest 20 is strapped to a seat belt 70 with straps 24. In FIG. 2, user 30, a pilot, anticipates crashing, and has attached air mask 60 to his face with air mask attachment means 64, which may comprise, for example, elastic. String 43 is clipped onto a shoulder harness 72 with clip 44. User 30 has caused air bag 50 and collar 22 to inflate by leaning forward a sufficient distance while string 43 was clipped to shoulder harness 72 to cause trigger 42 to break seal 41. When the pressurized air from cylinder 40 enters air bag 50, valve 65 responds to the pressure by closing. It remains closed, for a short period of time, until air bag 50 is filled with air. It then opens and, if there is smoke in the cockpit, user 30 will leave valve 62 open to provide fluid communication between air bag 50 and air mask 60 so that user 30 can breathe the air in air bag 50. Otherwise, user 30 would shut valve 62 to prevent the air from escaping from air bag 50.

If the airplane crashes, air bag 50 will prevent the face of user 30 from contacting the instrument panel of the airplane. Collar 22, between the body of user 30 and shoulder straps 71, cushions the impact of the torso of user 30 against shoulder straps 71, decreasing the likelihood of upper torso injury.

If the plane lands in a body of water, collar 22 will keep user afloat (user 30 would, of course, detach straps 24 from seat belts 70 before exiting the airplane).

After the emergency is over, valve 23 is squeezed to allow air to exit collar 22 into air bag 50, and air bag 50 is deflated by folding it such that the air therein exits via air tube 61 through air mask 60. Folded air bag 50 is then stored in air bag storage pouch 51, and spent air cylinder 40 is removed and replaced by a new, sealed air cylinder.

Although, in FIG. 2, user 30 has anticipated a crash and has intentionally caused trigger 42 to operate by leaning forward, triggering of vest 20 can be done automatically. If, for example, vest 20 is being worn by a user with straps 24 attached to a seat belt and clip 44 attached to a shoulder harness of an automobile, and the automobile is involved in an head-on collision, the sudden forward motion of the user's body would cause string 43 to pull trigger 42, causing seal 41 to break and air bag 50 and collar 22 to inflate.

Vest 20 can be folded or rolled up and carried by persons so that it will be available wherever they are. Vest 20 is not only useful in airplanes and cars. Inflatable collar 22 can be useful as an emergency personal floatation device if one is in a boat which sinks, or if the person wearing vest 20 is thrown from a boat. Vest 20 can be worn by persons working around containers of noxious gases so that, if there is a gas leak, the wearer can inflate air bag 50, put on mask 60, and breathe the air in bag 50 while he escapes from the source of the leak. A guest in a hotel which catches fire can likewise inflate bag 50 and breathe the air therein while he escapes from the smoke-filled hotel.

Vest 20 can thus be used in a variety of situations to increase a person's chance of survival in the event of a disaster.

An alternative embodiment of the present invention, safety device 110, is shown in FIGS. 3-5. Safety device 110 includes an air bag 50 (FIG. 5), an air-bag storage pouch 151 including a flap 52 to allow the top thereof to open, and straps 124 and 125 to allow pouch 151 to be attached to a safety belt, such as seat belt 170 or shoulder belt 171 (FIGS. 4 and 5). Straps 124 and 125 have resilient hook material 27 and loop material 26 thereon, respectively. Straps 124 and 125 could be replaced by any convenient means for attaching air-bag storage pouch to a safety belt, such as with a clip (not shown). A hole 53 in the side of pouch 151 allows trigger string 43 to pass therethrough.

A user 130 attaches pouch 151 to seat belt 170 by folding strap 125 over belt 170 and folding strap 124 over strap 125. She then clips clip 44 onto shoulder harness 172 of her automobile seat 180. When user 130 is in an accident (FIG. 5) her sudden forward movement causes string 43 to pull trigger 44, causing seal 41 (not shown in FIG. 5) to break, and air bag 50 to inflate, protecting her against impact with the steering wheel (not shown in the drawings) or the windshield.

Although a trigger and string system for causing the bag to inflate has been shown in the drawings, some other triggering mechanism which need not attach to a portion of the vehicle in which it is being used, such as a triggering mechanism that responds to sudden deceleration, may be used.

In view of the numerous modifications which could be made to the preferred embodiments disclosed herein without departing from the scope or spirit of the present invention, the details herein are to be interpreted as illustrative and not in a limiting sense.

What is claimed as invention is:

1. Safety apparatus comprising:
 (a) a normally deflated air bag;
 (b) means for inflating the air bag with breathable gas;
 (c) an air mask;

(d) means for connecting the air mask to the air bag; and (e) automatic valve means for preventing fluid communication between the air bag and the air mask while the air bag is inflating.

2. The apparatus of claim 1, wherein the means for inflating the air bag with breathable gas comprises a container of compressed air, the container being connected to the bag.

3. The apparatus of claim 1, further comprising:
means for attaching the air mask to a person's face.

4. The apparatus of claim 1, further comprising:
means for attaching the air bag adjacent a person's torso.

5. The safety apparatus of claim 1, further comprising:
trigger apparatus for causing the air bag to inflate in response to a predetermined stimulus.

6. The safety apparatus of claim 5, further comprising:
means for automatically activating the trigger apparatus.

7. The apparatus of claim 1, further comprising:
a normally deflated floatation collar.

8. The apparatus of claim 7, further comprising:
valve means for allowing air to automatically enter the collar when the air bag is inflated.

9. The apparatus of claim 1, further comprising:
strap means for attaching the apparatus to a seat belt.

10. The apparatus of claim 1, further comprising:
valve means for selectively providing fluid communication between the air mask and air bag.

11. The apparatus of claim 4, wherein the means for attaching the air bag adjacent a person's torso comprises a vest.

12. Safety apparatus comprising:
(a) a normally deflated air bag;
(b) a normally deflated floatation collar;
(c) means for inflating the air bag and the floatation collar;
(d) valve means for allowing fluid communication between the air bag and the floatation collar;
(e) an air mask; and
(f) means for connecting the air mask to the air bag.

13. The apparatus of claim 12, further comprising:
means for attaching the air mask to a person's face.

14. The apparatus of claim 12, wherein the means for inflating the air bag comprise breathable air.

15. Safety apparatus comprising:
(a) a normally deflated air bag which, when inflated, has a volume of at least 10 liters;
(b) means, for inflating the air bag, comprising a cylinder of compressed gas;
(c) attachment means for releasably attaching the air bag to a safety seat belt in an automobile; and
a trigger mechanism for piercing the cylinder of compressed gas comprising a clip for clipping onto a shoulder harness in the automobile.

* * * * *